United States Patent [19] [11] Patent Number: 4,599,644
Fischer [45] Date of Patent: Jul. 8, 1986

[54] METHOD OF AND APPARATUS FOR MONITORING VIDEO-CHANNEL RECEPTION

[76] Inventor: Peter Fischer, Dolderstr. 40, 8032 Zürich, Switzerland

[21] Appl. No.: 664,684

[22] Filed: Oct. 25, 1984

Related U.S. Application Data

[63] Continuation-in-part of Ser. No. 614,414, May 25, 1984, abandoned.

[30] Foreign Application Priority Data

May 25, 1983 [DE] Fed. Rep. of Germany ....... 3318919

[51] Int. Cl.$^4$ ............ H04N 17/04; H04N 7/08; H04N 17/06
[52] U.S. Cl. .......................... 358/84; 358/146; 455/2
[58] Field of Search .......... 358/84, 146; 455/2; 179/2 AS

[56] References Cited

U.S. PATENT DOCUMENTS

| 3,514,530 | 5/1970 | Simons ................. | 358/84 |
| 3,737,566 | 6/1973 | Baer et al. | |
| 4,044,376 | 8/1977 | Porter ................. | 358/84 |
| 4,058,829 | 11/1977 | Thompson ............. | 358/84 |
| 4,230,990 | 10/1980 | Lert, Jr. et al. ........ | 358/84 X |
| 4,317,215 | 2/1982 | Tabata et al. ......... | 455/2 X |
| 4,425,578 | 1/1984 | Haselwood et al. ..... | 358/84 |

FOREIGN PATENT DOCUMENTS

| 1137215 | 12/1982 | Canada ................. | 358/84 |
| 103438 | 3/1984 | European Pat. Off. . | |

OTHER PUBLICATIONS

Brockhaus, "Naturwissenschaften und Technik," vol. 4, NI-SN, F. A. Brockhaus, Wiesbaden, 1983, p. 298.
John Markus, "Electronics Dictionary", p. 133.
*Electronic Design*, "Electronics Helps Advertisers keep Track of Their TV Ads," May 27, 1971, pp. 26–28.
Jan Gecsei, "The Architecture of Videotex Systems," ©1983, p. 46, Prentice-Hall, Inc., Englewood Cliffs, N.J.; TK 5105.G43, 1983.

*Primary Examiner*—Keith E. George

[57] ABSTRACT

In order to gather information on the reception of video channels in a household or other location equipped with a television receiver, partinent data such as identification and viewing time are injected into an assigned minor area of the TV picture at the receiving location. The injected data, appearing in digitized form in the assigned area where the TV picture has been blocked out, are picked up by a photosensor juxtaposed with the CRT screen of the receiver, or possibly from a video output thereof, and are fed to a processor for transmission over a telephone line with or without intermediate storage to an evaluation center. A data injector inserted between an antenna and an input terminal of the receiver blanks the incoming video signal of a selected channel during a small fraction of a frame-scanning cycle, while the CRT beam sweeps the assigned area, and replaces it with the digitized data. Alternatively, the blanking of the assigned area and insertion of channel identification may take place at the transmitting station.

13 Claims, 3 Drawing Figures

4,599,644

METHOD OF AND APPARATUS FOR MONITORING VIDEO-CHANNEL RECEPTION

CROSS REFERENCE TO RELATED APPLICATION

This is a continuation-in-part of application Ser. No. 614,414 filed May 25, 1984, now abandoned.

FIELD OF THE INVENTION

My present invention relates to a method of and an apparatus for monitoring the reception of video channels in a telecommunication system by viewers of television programs, e.g. for statistical or rating purposes.

BACKGROUND OF THE INVENTION

Systems for the evaluation of viewer preferences require the ingathering of various data from individual households or other locations equipped with television receivers, including particularly the times during which a given channel is turned on. Identification of the viewing locations is also useful in many cases. These data may be supplied to an evaluation center, usually via telephone lines, from monitoring units at the viewing locations; such units may be coupled with the respective television sets for the identification of the channels currently being received, e.g. by a system of the type disclosed in U.S. Pat. No. 4,425,578 to Haselwood et al. The monitoring units may further be provided with keyboards or the like by which viewers observing a given program may identify themselves so that the evaluation center can also receive information on, say, the number, the age and the sex of persons watching a program in a particular houshold. Reference in this connection may be made, for example, to German laid-open application No. 24 04 074, published Aug. 7, 1975, which shows such a keyboard in a system wherein channel-identifications and timing signals are fed after interim storage to a telephone for forwarding to a central data processor. A generally similar system is the subject matter of German patent No. 26 08 508, issued Feb. 28, 1980, according to which a channel sensor comprises a network disposed close to the television receiver and turned to its line-scanning frequency to determine whether the receiver is turned on or off; according to another arrangement disclosed in that German patent, a tuner connected to a TV antenna picks up the sounds of sequentially scanned channels and works into a comparator which also receives sound signals detected by a microphone juxtaposed with the television set, being thus able to ascertain to which channel—if any—the television set has been adjusted.

OBJECTS OF THE INVENTION

The general object of my present invention is to provide an improvement over these known methods and systems by virtue of which a significant number of demographically or statistically interesting data for the monitoring of television reception can be conveniently gathered for transmission, with or without interim storage, to an evaluation center and/or to a local reader.

A more particular object is to enable the accumulation of such data not only during real-time TV reception but also when a program previously stored on a recording medium is visually reproduced on the screen of a television receiver.

SUMMARY OF THE INVENTION

In accordance with my present invention, a visually insignificant area of a picture displayed on a viewing screen of a TV receiver is blanked out with replacement of its video-signal content by the monitoring data to be gathered, the data so injected into the blanked area of the picture being sensed for processing in the manner indicated above.

Advantageously, the sensing is carried out photoelectrically by a detector juxtaposed with the blanked area of the viewing screen, the detector preferably comprising one or a group of several photocells, photodiodes, phototransistors, photothyristors or the like. Alternatively, if the television receiver is equipped with a video output, the injected data can be picked up at the proper instants of a frame-scanning cycle at that output. In either case, with the injected data initially converted into digital form, their bits will produce distinct pixels (either black or white) on a contrasting background so as to appear consecutively during the scanning of the area assigned to them. That area ought to be as unobtrusive as possible and is preferably located at a corner of the viewing screen.

In its general aspects, my invention encompasses the possibilities of injecting the monitoring data at the viewing location or—at least in part—at a transmitting station at which a given program originates. In the latter instance, digitized channel-identification and program codes inserted into the area blanked out for this purpose are radiated to all the receivers together with the actual picture. Even then, additional information (e.g. the address of the receiving location) may be introduced into the same area at the point of reception.

Advantageously, the sensing of data in the manner indicated above makes it possible to check automatically whether the replacement of the video-signal content by monitoring data is performed in the correct channel, which is the channel that is selected at the TV receiver. If the result of this check should be negative, i.e. if no data and/or no blanked area as such is sensed at the given area of the screen or the given instants of the frame-scanning cycle at the receiver, this indicates that the monitoring data are being used in the wrong channel, i.e. a channel different from the channel that is chosen at the receiver. Thus, the video-channel may be changed automatically until the result of this check turns positive, i.e. until data or said blanked area as such is sensed correctly in the channel chosen at the receiver.

It should be noted that, in an entirely different context, coded messages without demographic significance are flashed onto a selected area of a television screen by an apparatus disclosed in U.S. Pat. No. 3,737,566 to Baer et al.

An apparatus for reception-point data injection is interposed between a source of incoming video signals modulated upon different carrier frequencies—i.e. an antenna or a cable—and a signal input of a television set served thereby. The apparatus includes a tuner for the selection of an incoming video channel, working into a demodulator which controls a synchronizer in response to incoming line- and frame-synchronizing signals. The synchronizer, in turn, activates a blanking and insertion circuit for the suppression of the incoming video signals of the selected channel and their replacement by the locally generated data pulses at the instants reserved for them, e.g. at the beginnings of the first few line scans of a frame. A processor in the apparatus, to which these data pulses are fed back via a photosensor or a video output as discussed above, has a memory which stores the data to be injected and which may also temporarily register the data pulses picked up, together with such ancillary information as time of day and personalia of the viewers, for subsequent transmission to an evaluation center during periods of low and possibly cheaper telephone traffic. Thus, an output of the processor may be connected to a modem, interfacing it with a telephone line, and/or to some other peripheral unit such as a printer, a long-term recorder or a display device.

Advantageously, the apparatus provided according to the main aspect of my invention may further comprise automatic channel-selection means including a tuner and a tuner control system, which are controlled by said processor and which are controlling said synchronizer. By way of this tuner and tuning control system being controlled by the processor a specific video-channel may be selected automatically. upon feed-back of the information from the photosensor or the video output of the receiver said tuner and tuning control system will change said channel step by step until said processor in fact detects the monitoring data or the blanked area as such. Thus automatically the selected channel of said apparatus is made identical with the channel selected at the receiver set by push-button selection. Of course the tuner provided according to this aspect of my invention must comprise a heterodyne-oscillator as usual to obtain the necessary beat-frequency. As this is standard-technique additional information is not necessary with regard to the tuner's construction.

According to a further aspect of my invention care is taken of the case that two different channels should carry programs that accidentally are totally coincident in frame and line timing. Of course, in this case the automatic channel identification and feed-back operation indicated above will fail. To take care of this problem an adjustable oscillator is provided, the frequency of which is equal to the frequency of the tuner, which itself is the expected frequency of the channel to be chosen at the receiver set. In case of a coincidence of frequencies of tuner and receiver set a black spot is produced by the oscillator as long as data injection takes place. This black spot indicates that the correct channel of both otherwise identical channels is chosen.

BRIEF DESCRIPTION OF THE DRAWING

The above and other features of my invention will now be described in detail with reference to the accompanying drawing in which.

SPECIFIC DESCRIPTION

Figure 1:
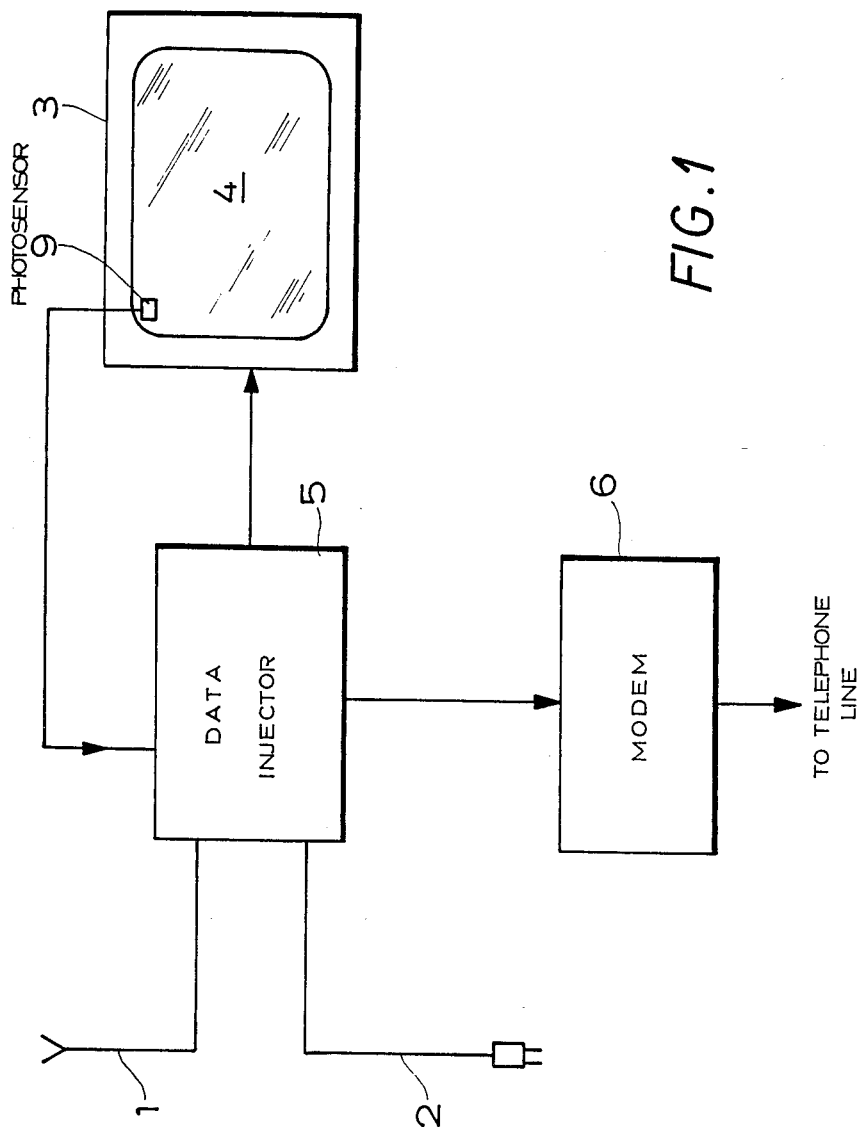
FIG. 1 is a diagrammatic view of a television receiver associated with a data injector and photosensor in accordance with one embodiment of my invention.

FIG. 1 shows a convential television receiver 3 with a viewing screen 4, forming part of a cathode-ray tube, to which incoming video signals modulated upon different carriers originating at respective transmitting stations are fed by an antenna 1. Interposed between this antenna and a signal input of receiver 3 is a data injector 5 to which monitoring data displayed along with a TV picture—as more fully described hereinafter—are fed back by a photosensor 9 closely juxtaposed with a small, unobtrusive area of screen 4 at the upper left-hand corner thereof. Data injector 5, which represents an apparatus embodying my present invention, works into a peripheral unit 6 designed as a modem through which information accumulated therein can be transmitted to a telephone line for delivery to a centralized evaluator. Receiver 3 and data injector 5 are energized by a cable 2 plugged into a nonillustrated wall socket.

The receiving set 3 is further provided with the usual knobs or pushbottons, not shown, for on/off control and channel selection. Antenna 1 could be replaced by another source of incoming carrier waves, such as a cable extending from a transmitting station (as shown at 22 in FIG. 3) or from a master antenna serving a number of receiving stations.

Figure 2:
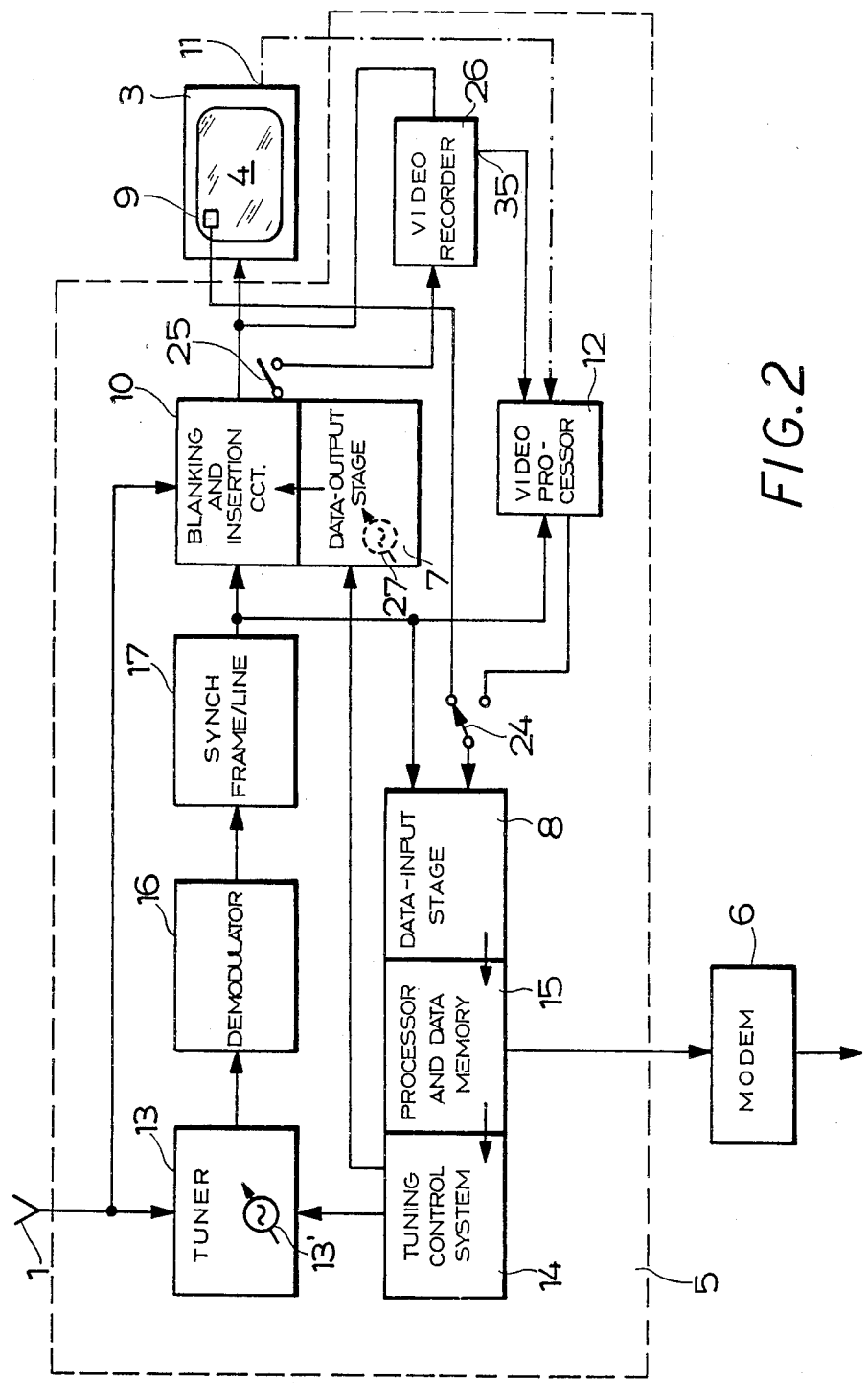
FIG. 2 is a more detailed block diagram of the assembly of FIG. 1.

Details of the data injector 5 are illustrated in FIG. 2 which shows it as including a data-output state 7 and a data-input stage 8, the latter working directly into a processor 15 which contains a data memory and feeds accumulated monitoring data to the modem 6. Antenna 1 is connected to a tuner 13 comprising an adjustable oscillator 13' as usual, which is adjustable by an automatic tuning control system 14 to extract an intermediate frequency from a particular channel chosen automatically by the tuning control system 14. The extracted IF signal for the chosen channel is fed to a demodulator 16 delivering frame-synchronizing and line-synchronizing pulses from the selected channel to a synchronizer 17 for frame and line controlling a blanking and insertion circuit 10 connected to antenna 1 as well as to data-output stage 7. At instants determined by synchronizer 17, occuring during a period which is a small fraction of a frame-scanning cycle corresponding to the time, the beam of the CRT would dwell on the area on screen 4 overlain by photosensor 9, the incoming radiofrequency signals normally transmitted directly to the input of receiver 3 are blanked by the blanking and insertion circuit 10 and are replaced by pulses representing digitized data stored in the memory of processor 15 and delivered by way of system 14 and stage 7 to circuit 10. The data may include, besides an identification of the selected channel, the address of the location equipped with television set 3 and additional information stored in the memory of processor 15, such as the number and personalia of viewers currently observing the TV-program. In case that the channel automatically chosen by system 14 coincides with the channel selected at the set 3 these data pulses appear at the assigned area of the screen 4 and are picked up by the photosensor 9 for feedback via data-input stage 8 to processor 15 which accumulates them over a predetermined number of frame cycles before delivering them to modem 6 or to its memory for temporary storage. The accumulated data can be accompanied by timing signals from a clock forming part of or connected to the processor 15.

If the set 3 is not tuned to the channel chosen by system 14, the timing signals emitted by synchronizer 17 will generally not coincide with the illumination of the assigned area of screen 4 by the CRT beam so that photosensor 9 will not pick them up. In this case, since this information is received by the processor 15 as well, the processor 15 will make tuning control system 14 step to the next channel and so forth until the tuning of the data injector 5 correlates automatically with the tuning of set 3, i.e. the channel chosen by data injector 5 becomes identical to the channel chosen at set 3. Such automatic step-technique is widely known with car-radio receivers as "channel-searching" and needs no detailed description, here(see BROCKHAUS "Naturwissenschaften und Technik", Volume 4, NI-SN, F. A. Brockhaus, Wiesbaden, 1983, page 298 "Sendersuchlauf").

Also shown in FIG. 2 is a video processor 12 connected to a video output 11 of TV set 3 and controlled by synchronizer 17 in parallel with circuit 10. A switch 24 may connect the data input of data-input stage 8 to video processor 12, instead of photosensor 9, if the associated set 3 does in fact have a video-output 11; photosensor 9 may be removed in that case from the screen 4.

A further switch 25 shown in FIG. 2 enables the transmission of the output signals of circuit 10, i.e. of the incoming RF signals and injected data pulses, to a video-recording deck 26. The video-recording deck 26 may be connected to circuit 10 instead of set 3 or in parallel thereto. Anyway the video-tape of deck 26 carries the data pulses. The deck 26 is connected to the video processor 12 via output 35 for initial check of the data pulses. Moreover, upon playback of a recorded program via screen 4 the data pulses from the tape are recognized automatically by photosensor 9 or via video output 11. The described feedback of data can therefore also take place upon subsequent reproduction of a recorded program on screen 4.

An adjustable oscillator 27 shown in FIG. 2 as an optional equipment in dashed lines serves its purpose in case that two different channels should carry programs that accidentally are totally coincident in frame and line timing. In this case the automatic channel identification and follow operation of system 14 would normally fail. Now the frequency of the oscillator 27 is set equal to the frequency of the tuner 13, which is the expected frequency of the channel chosen at set 3. In case of coincidence of frequencies of tuner 13 and set 3, a black spot is produced by oscillator 27 as long as data injection takes place. Thus even for this exceptional case the oscillator 27 guarantees the correct tuning of the system 5 with respect to set 3.

Figure 3:
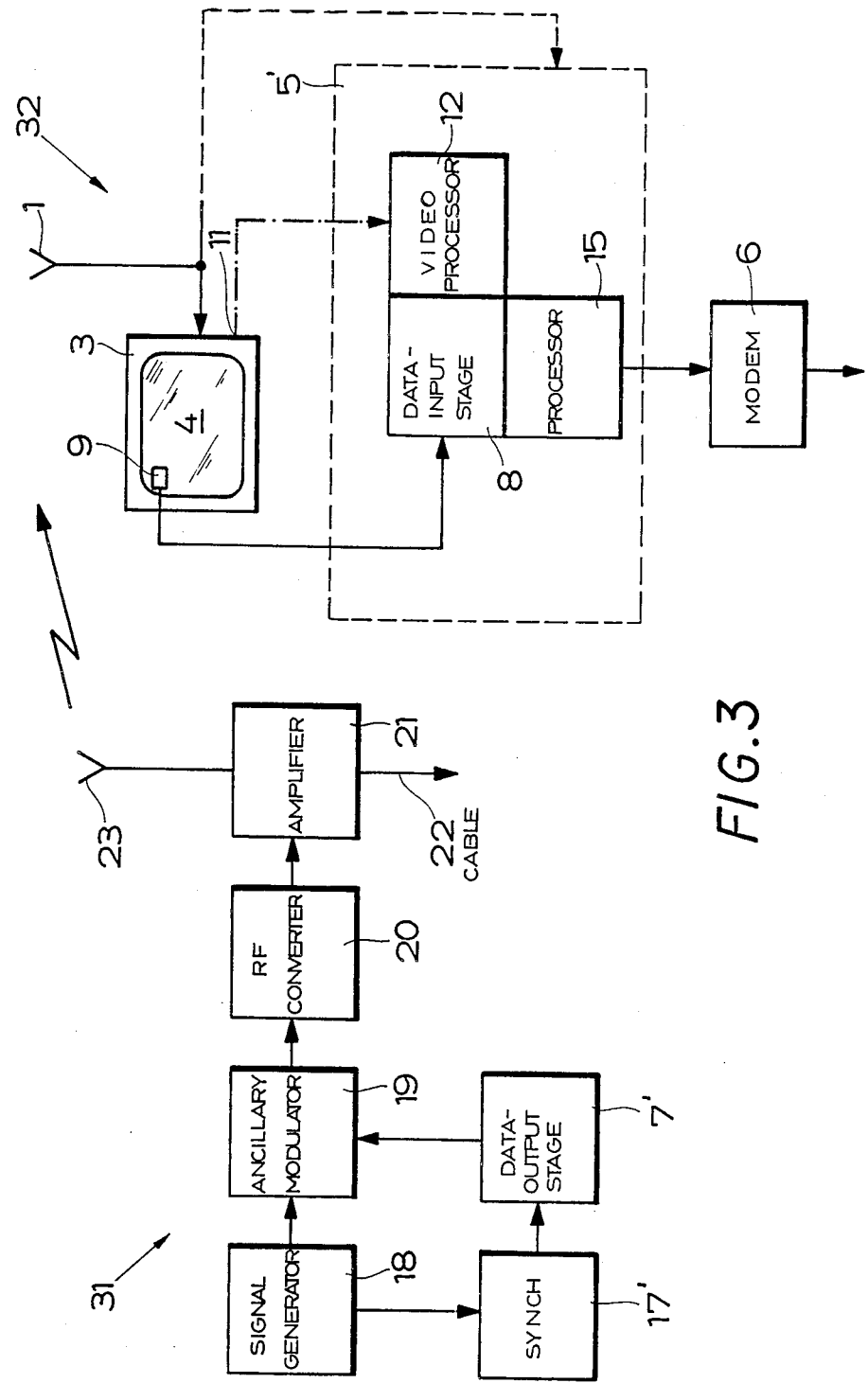
FIG. 3 is a block diagram of a transmitting station and a receiving location conforming to another embodiment of my invention.

Reference will now be made to FIG. 3 where I have shown a modified telecommunication system in which a transmitting station 31 sends out video-modulated carrier waves, via a cable 22 or an antenna 23 energized by an output amplifier 21, to a receiving station 32 generally similar to that of FIG. 2. Transmitting station 31 comprises a signal generator 18 connected to a nonillustrated video camera or any other video signal source and to a synchronizer 17' controlling an ancillary modulator 19 through an output stage 7' for the injection of monitoring data, such as a channel-identification code and a program code, into the signal flow passing from generator 18 via an RF converter 20 to amplifier 21. Modulator 19 operates in a manner analogous to that of blanking and insertion circuit 10 described with reference to FIG. 2. However, the monitoring data referred to could also be directly delivered to the video camera for insertion into a blanked area of the viewing field.

In this instance, an apparatus 5' assiscied with TV set 3 in receiving station 32 no longer need insert locally stored information in the form of digital pulses in the area assigned therefor, provided that the data injected at transmitting station 31 are the only ones of interest. Thus, apparatus 5'—of which only the data-input stage 8, the video processor 12 and the processor 15 of FIG. 2 have been illustrated for simplicity's sake—need not include components 7, 10, 13, 14, 16, 17 of FIG. 2. If, however, additional data are to be injected locally, apparatus 5' may have the same structure as its counterpart in FIG. 2 except that circuit 10 no longer will have to carry out any signal-suppressing function as long as enough blanked area to accomodate the additional data pulses has been spaced out at the transmitting station.

I claim:

1. A method of monitoring video-channel reception at a location served by a plurality of transmitting stations, sending out video signals modulated on carrier frequencies representing different channels, and equipped with a television receiver to which incoming video signals are fed and which is tuned to reproduce the video signals of a selected channel as a picture displayed on a viewing screen of the receiver comprising the steps of:
   (a) blanking a visually insignificant area of a picture which is to be displayed on said viewing screen;
   (b) injecting data relevant to the viewing of said picture in the blanked area thereof;
   (c) sensing the data appearing in said blanked area during step (b); and
   (d) processing the data sensed in step (c) to determine the selected channel, wherein steps (a) through (d) are performed at said location during the viewing of a picture displayed on said screen.

2. A method as defined in claim 1 wherein said data are injected in digital form in step (b) and are consecutively sensed in step (c) with the aid of a synchronizer controlling visual display of the incoming signals.

3. A method as defined in claim 1 wherein step (c) is performed photoelectrically by a detector juxtaposed with the blanked area of said viewing screen.

4. A method as defined in claim 1 wherein step (c) is performed electronically via a video-output of said receiver and a video processor connected to said video-output.

5. A method as defined in claim 1 wherein the receiver includes a video recorder and wherein step (c) is performed electronically via a video-output of said video-recorder and a video processor connected to said video-output.

6. A method as defined in claim 1 wherein the sensing of data in said blanked area as such in step (c) is used for automatically checking whether steps (a) and (b) were performed in a selected video-channel corresponding to the selected channel of the receiver and, in case that the result of said check is negative, for automatically changing the video-channel selected in the method until the result of said checking turns positive because of sensing of data in said blanked area.

7. In a telecommunication system wherein a television receiver at a location served by a plurality of transmitting stations, sending out video signals modulated on carrier frequencies representing different channels, is tunable to reproduce the video signals of a selected channel as a picture displayed on a viewing screen,
   the combination therewith of an apparatus interposed between a source of incoming carrier frequencies and a signal input of said receiver, said apparatus comprising pick-up means coupled with said receiver, synchronizing means operatively connected to said source for generating line-synchronizing and frame-synchronizing signals enabling said pick-up means to detect monitoring data replacing said video signals during a small fraction of a recurring frame cycle of a selected channel corresponding to a visually insignificant area of the picture, processing means connected to said pick-up means for accumulating the detected monitoring data and delivering same to an associated peripheral unit, and blanking means controlled by said synchronizing means and by said source for suppressing incoming video signals during a scan of said area and inserting said monitoring data into said area, wherein said processing means preferably includes a memory storing some or all of said monitoring data in a digitized form.

8. The combination defined in claim 7 wherein said pick-up means comprises a photosensor juxtaposed with a minor area of said viewing screen illuminated by said monitoring data upon a display of said picture.

9. The combination defined in claim 8 wherein said photosensor is unobrusively disposed at a corner of said viewing screen.

10. The combination defined in claim 7 wherein said pick-up means comprises a video processor connected to a video output of said receiver as well as to an output of said synchronizing means.

11. The combination defined in claim 7 wherein said receiver includes a video-recorder and wherein said pick-up means comprises a video processor connected to a video output of said video-recorder as well as to an output of said synchronizing means.

12. The combination defined in claim 7 wherein said apparatus further comprises automatic channel-selection means including tuner means and tuner control means controlled by said processing means and controlling said synchronizing means for automatically selecting a specific video-channel and changing said channel of said apparatus until said pick-up means in fact detects said monitoring data replacing said video signal indicating that said selected channel of said receiver set is identical with the selected channel of said apparatus.

13. The combination defined in claim 12 wherein said synchronizing means comprises oscillator means for producing an output signal only in said selected channel of said apparatus, said output signal being part of said monitoring data.

* * * * *